(12) United States Patent
Nishi et al.

(10) Patent No.: US 8,054,755 B2
(45) Date of Patent: Nov. 8, 2011

(54) MEASUREMENT MANAGING APPARATUS AND COMMUNICATION SYSTEM

(75) Inventors: Tetsuya Nishi, Kawasaki (JP); Tomonori Gotoh, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 12/358,949

(22) Filed: Jan. 23, 2009

(65) Prior Publication Data

US 2009/0290500 A1    Nov. 26, 2009

(30) Foreign Application Priority Data

May 22, 2008  (JP) ................... 2008-134221

(51) Int. Cl.
*H04L 12/26* (2006.01)
(52) U.S. Cl. ...................................... 370/250
(58) Field of Classification Search ............ 370/241, 370/241.1, 248, 250
See application file for complete search history.

(56) References Cited

U.S. PATENT DOCUMENTS 6,515,967 B1 * 2/2003 Wei et al. ............... 370/244
7,693,092 B2 * 4/2010 Nishi ..................... 370/256

FOREIGN PATENT DOCUMENTS

JP   A 2007-221619    8/2007
WO  WO 2006/098024  * 9/2006

* cited by examiner

*Primary Examiner* — Aung S Moe
*Assistant Examiner* — Kerri Rose
(74) *Attorney, Agent, or Firm* — Fujitsu Patent Center

(57) ABSTRACT

A test packet transmitting apparatus transmits respective test packets including different pieces of identification information to a repeating installation. The repeating installation makes a predetermined number of copies of each test packet received from the test packet transmitting apparatus to be transmitted to a test packet receiving apparatus, and determines the predetermined number of copies as a population to measure a communication quality. The test packet receiving device counts the received test packets according to each type of identification information.

8 Claims, 15 Drawing Sheets

MEASUREMENT MANAGING APPARATUS AND COMMUNICATION SYSTEM

CROSS REFERENCE TO RELATED APPLICATIONS

This application is based upon and claims the benefit of priority from the prior Japanese Patent Application No. 2008-134221, filed on May 22, 2008, the entire contents of which are incorporated herein by reference.

FIELD

The embodiment discussed herein is related to a measurement managing apparatus and a communication system.

BACKGROUND

When adding a new service such as Voice over IP (VoIP) in an Internet Protocol (IP) network, it is important to previously perform confirmation of communication and of a quality between multiple sites, or a high-load test for estimation of the number of connections enabling telephone calls and to verify a quality of the network, e.g., specification of a location of failure in the network or check on the number of connections causing degradation of a quality.

To realize such a quality test between multiple sites by using a small number of test tools (measuring instruments), a method of transmitting a test packet from a test packet transmitting apparatus provided outside a target section by using a multicast address to measure a communication quality in the target section is utilized. According to a Protocol Independent Multicast-Sparse Mode (PIM-SM), a multicast protocol, a repeating installation (router) set at a Rendezvous Point (RP) can execute multicast distribution.

In light of this function, the repeating installation is set as the RP for a test packet at a starting end of the target section where a communication quality is measured. The test packet transmitted from the test packet transmitting apparatus provided outside the target section is relayed by the repeating installation at the starting point of the target section and is received by a test packet receiving apparatus at an end point of the target section. As a result, a communication quality in the target section can be measured even if the test packet transmitting apparatus is not provided in a subnet at the starting point of the target section.

However, in the conventional technology, when the test packet transmitted from the test packet transmitting apparatus provided outside the target section is not received by the test packet receiving apparatus, it is difficult to distinguish a situation where the unreceived test packet is lost before reaching the target section from the test packet transmitting apparatus from a situation where the unreceived test packet is lost in the target section after reaching the target section.

Therefore, when the communication quality of the target section is calculated based on the number of the test packets transmitted by the test packet transmitting apparatus and the number of the test packets received by the test packet receiving apparatus, losses of test packets that occur between the test packet transmitting apparatus and the target section are included in a communication quality calculation result. Therefore, there is a problem that the communication quality of the target section cannot be accurately measured.

SUMMARY

According to an aspect of the invention, a computer-readable recording medium storing a program causes a computer that controls a test packet transmitting apparatus provided in a first subnet, a repeating installation that is provided in a second subnet and performs multicast distribution of the received packet according to a routing table, and a test packet receiving apparatus provided in the third subnet to perform: setting a multicast address serving as a destination address of a plurality of test packets including different pieces of identification information in the test packet transmitting apparatus; setting the multicast address in the routing table as a relay address required to identify packets as relay targets of the repeating installation; setting a plurality of distribution destination addresses associated with the relay address in the routing table; setting the distribution destination addresses in the test packet receiving apparatus as reception addresses required to identify packets as reception targets of the test packet receiving apparatus; controlling the test packet transmitting apparatus in a manner that the test packet transmitting apparatus transmits the test packets; and acquiring a counting result for each identification information of each test packet received by the test packet receiving apparatus from the repeating installation as a result of the controlling.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to the accompanying drawings.

In the exemplary embodiments, a repeating installation makes a predetermined number of copies of each test packet received from a test packet transmitting apparatus to be transmitted to a test packet receiving apparatus and determines the predetermined number of duplicate test packets as a population to measure a communication quality, whereby the communication quality between the repeating installation and the test packet receiving apparatus is accurately measured.

Figure 1:
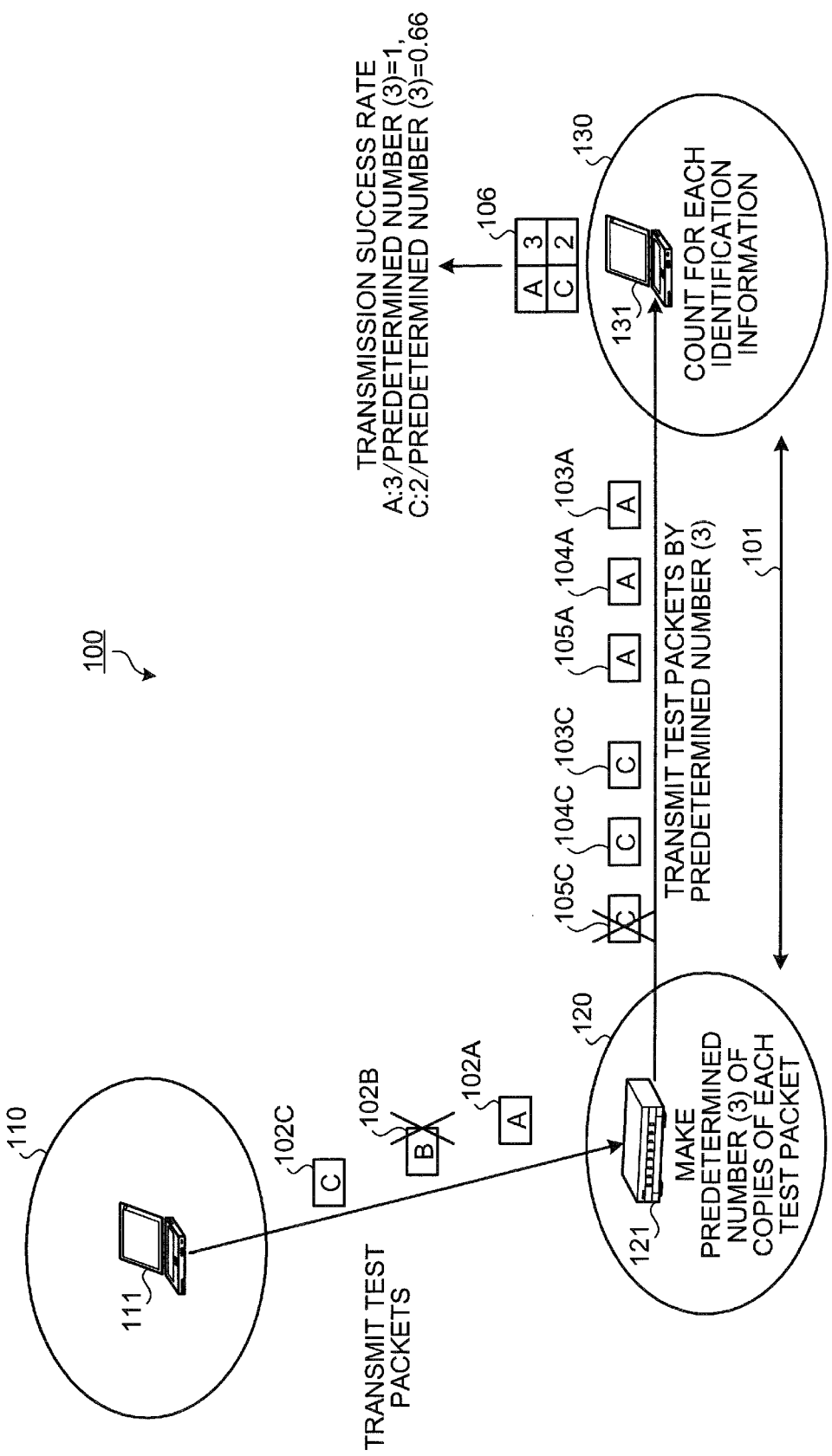
FIG. 1 is a block diagram of an outline of a measuring method.

FIG. 1 is a block diagram of an outline of the measuring method. As depicted in FIG. 1, a communication system 100 includes a first subnet 110, a second subnet 120, and a third subnet 130. In the first subnet 110 is provided a test packet transmitting apparatus 111. In the second subnet 120 is provided a repeating installation 121. In the third subnet 130 is provided a test packet receiving apparatus 131.

This measuring method is a method for measuring a communication quality of a section 101 between the second subnet 120 and the third subnet 130. First, the test packet transmitting apparatus 111 transmits respective test packets including different pieces of identification information to the repeating installation 121. An example where the test packet transmitting apparatus 111 transmits test packets 102A, 102B, and 102C including respective pieces of identification information A, B, and C to the repeating installation 121 will be explained.

It is assumed here that the test packet 102B is lost between the test packet transmitting apparatus 111 and the repeating installation 121. The repeating installation 121 receives the respective test packets transmitted from the test packet transmitting apparatus 111. Since the test packet 102B is lost along the way, the repeating installation 121 receives the test packets 102A and 102C.

Subsequently, the repeating installation 121 makes a predetermined number of (a plurality of) copies of each of the test packets 102A and 102C. An example where the predetermined number is three will be explained. The repeating installation 121 makes three copies of each of the received test packets 102A and 102C. Three packets of the copies of the test packet 102A are called test packets 103A, 104A, and 105A. Three packets of the copies of the test packet 102C are called test packets 103C, 104C, and 105C.

The repeating installation 121 transmits each predetermined number of duplicate test packets to the test packet receiving apparatus 131. Specifically, the repeating installation 121 transmits the test packets 103A, 104A, 105A, 103C, 104C, and 105C to the test packet receiving apparatus 131. It is assumed that the test packet 105C is lost between the repeating installation 121 and the test packet receiving apparatus 131.

The test packet receiving apparatus 131 receives test packets transmitted from the repeating installation 121. Since the test packet 105C is lost along the way, the test packet receiving apparatus 131 receives the test packets 103A, 104A, 105A, 103C, and 104C.

Subsequently, the test packet receiving apparatus 131 counts the received test packets 103A, 104A, 105A, 103C, and 104C based on identification information. A table 106 depicts a result of counting performed by the test packet receiving apparatus 131. Since the test packet receiving apparatus 131 receives the test packets 103A, 104A, and 105A including the identification information A, a counting result of the test packets including the identification information A is three as depicted in the table 106.

Since the test packet receiving apparatus 131 receives the test packets 103C and 104C including the identification information C, a counting result of the test packets including the identification information C is two as depicted in the table 106. Information indicative of a communication quality of the section 101 is calculated based on the counting result obtained by the test packet receiving apparatus 131 and the predetermined number "three".

For example, the test packet receiving apparatus 131 calculates a transmission success rate of test packets for each kind of identification information as information indicative of the communication quality of the section 101. Specifically, the test packet receiving apparatus 131 divides the counting result "three" of the test packets including the identification information A by the predetermined number "three". A result "1" represents a transmission success rate of the test packets 103A, 104A, and 105A in the section 101. The test packet receiving apparatus 131 also divides the counting result "two" of the test packets including the identification information C by the predetermined number "three". A result "0.66" represents a transmission success rate of the test packets 103C, 104C, and 105C in the section 101.

Alternatively, the test packet receiving apparatus 131 calculates a transmission success rate of all test packets including respective pieces of identification information as information indicative of a communication quality between the repeating installation 121 and the test packet receiving apparatus 131. Specifically, (the counting result of the test packets including the identification information A)+(the counting result of the test packets including the identification information C)=3+2=5 is divided by (the predetermined number)× (the number of types of the identification information of the received test packets)=3×2=6. A result "0.83" represents a transmission success rate of the test packets including the identification information A or the identification information C in the section 101.

Respective operations of the test packet transmitting apparatus 111, the repeating installation 121, and the test packet receiving apparatus 131 explained above are carried out based on control by a measurement managing apparatus. The measurement managing apparatus may be provided in a fourth subnet (not depicted), or may be provided in any one of the first subnet 110, the second subnet 120, and the third subnet 130.

Figure 2:
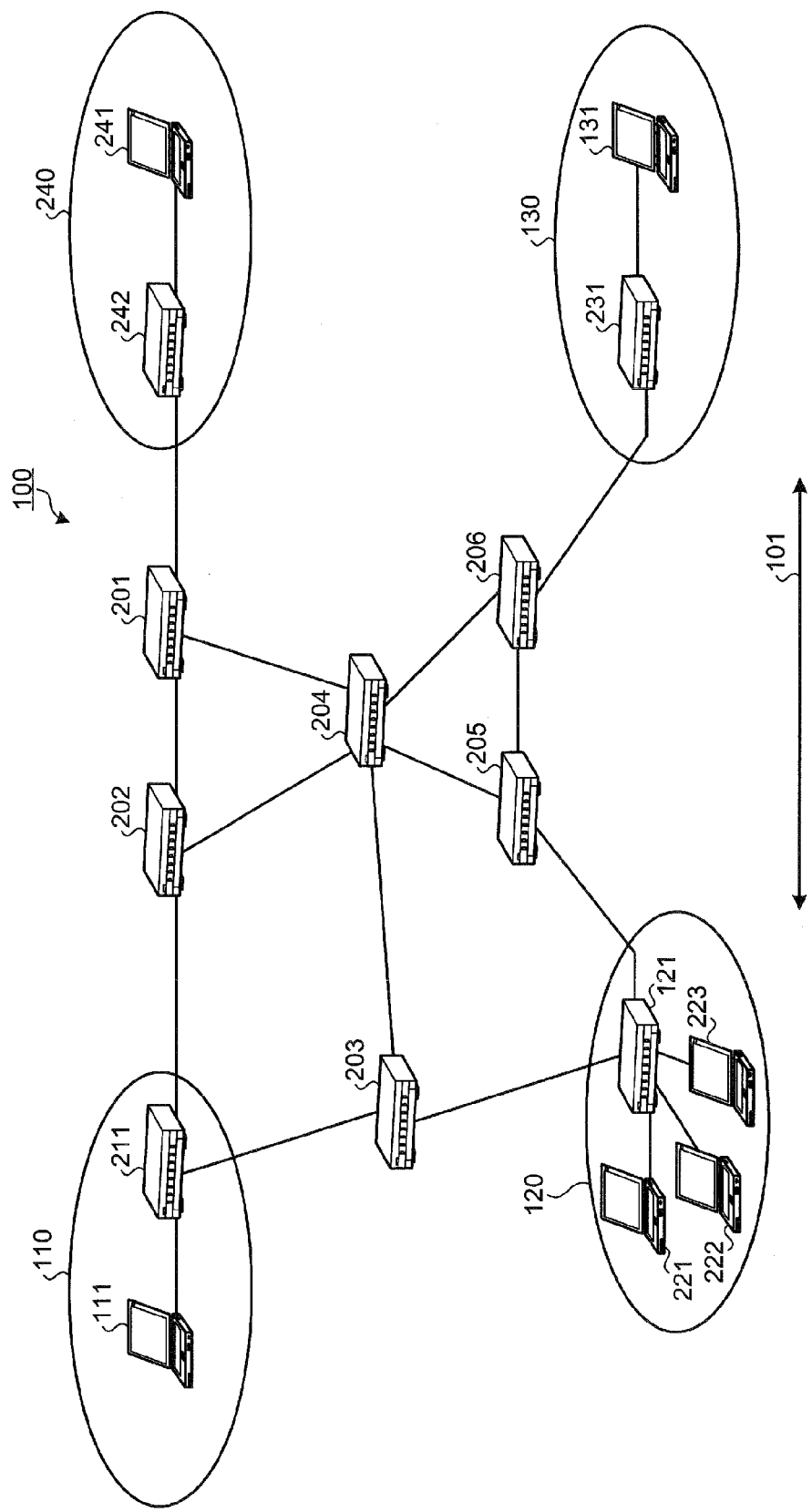
FIG. 2 is a block diagram of a structure of a communication system according to an embodiment.

FIG. 2 is a block diagram of a structure of a communication system according to an embodiment. In FIG. 2, elements identical to those depicted in FIG. 1 are given identical reference numerals, and an explanation thereof is omitted. As depicted in FIG. 2, in a communication system 100, a first subnet 110, a second subnet 120, a third subnet 130, and a fourth subnet 240 are connected in a mesh form through repeating installations 201 to 206.

A measurement managing apparatus 241 and a repeating installation 242 are provided in the fourth subnet 240. A test packet receiving apparatus 131 is connected with a repeating installation 231. The test packet receiving apparatus 131 transmits/receives a signal to/from a network provided outside the third subnet 130 via the repeating installation 231. The measurement managing apparatus 241 includes a computer that controls a test packet transmitting apparatus 111, a repeating installation 121, and the test packet receiving apparatus 131.

The measurement managing apparatus 241 has a function of a first setting unit that sets a multicast address serving as a destination address of a test packet in the test packet transmitting apparatus 111. Specifically, the measurement managing apparatus 241 sets the multicast address by transmitting a transmission setting signal including the multicast address as setting information to the test packet transmitting apparatus 111.

The measurement managing apparatus 241 also has a function of a second setting unit that sets in the repeating installation 121 a multicast address identical to the multicast address set in the test packet transmitting apparatus 111 as a relay address that is used to identify a packet as a relay target of the repeating installation 121. Specifically, the measurement managing apparatus 241 transmits to the repeating installation 121 an RP setting signal including as setting information a multicast address identical to the multicast address included as the setting information in the transmission setting signal.

The measurement managing apparatus 241 has a function of a third setting unit that sets a plurality of distribution destination addresses associated with the relay address set in the repeating installation 121 to a routing table included in the repeating installation 121. The measurement managing apparatus 241 has a function of a fourth setting unit that sets in the test packet receiving apparatus 131 a plurality of distribution destination addresses identical to the distribution destination addresses set in the routing table included in the repeating installation 121 as reception addresses used to identify a packet to be received by the test packet receiving apparatus 131.

Specifically, the measurement managing apparatus 241 transmits a distribution setting signal including distribution destination addresses as setting information to the test packet receiving apparatus 131. As a result, the distribution destination addresses are set in the routing table included in the repeating installation 121, and identical distribution destination addresses are set in the test packet receiving apparatus 131.

The measurement managing apparatus 241 has a function of a transmission control unit that controls the test packet transmitting apparatus 111 so that the test packet transmitting apparatus 111 can transmit a test packet. Specifically, the measurement managing apparatus 241 transmits a transmission start signal indicating that packet transmission should be started and a transmission stop signal indicating that test packet transmission should be stopped to the test packet transmitting apparatus 111.

The measurement managing apparatus 241 has a function of an acquiring unit that acquires a counting result of each test packet for each type of identification information received by the test packet receiving apparatus 131 from the repeating installation 121 as a result of controlling the test packet transmitting apparatus 111 to transmit test packets. Specifically, when a predetermined time passes after a transmission stop signal is transmitted, the measurement managing apparatus 241 transmits a result request signal to the test packet receiving apparatus 131 and receives a counting result transmitted from the test packet receiving apparatus 131. The measurement managing apparatus 241 outputs the acquired counting result.

The counting result acquired by the measurement managing apparatus 241 may be a counting result itself obtained by the test packet receiving apparatus 131 (e.g., table 106 depicted in FIG. 1) or a transmission success rate (or loss rate) of test packets calculated based on the counting result obtained by the test packet receiving apparatus 131. When the counting result acquired by the measurement managing apparatus 241 is the counting result itself obtained by the test packet receiving apparatus 131, the measurement managing apparatus 241 calculates and outputs, e.g., a transmission success rate (or loss rate) of test packets based on the acquired counting result.

The test packet transmitting apparatus 111 and a repeating installation 211 are provided in the first subnet 110. The test packet transmitting apparatus 111 transmits/receives a signal to/from a network provided outside the first subnet 110 via the repeating installation 211. Upon receiving a transmission setting signal from the measurement managing apparatus 241, the test packet transmitting apparatus 111 sets a multicast address included in the transmission setting signal as setting information as a destination address for test packets.

Upon receiving a transmission start signal transmitted from the measurement managing apparatus 241, the test packet transmitting apparatus 111 transmits a plurality of test packets whose identification information is different from each other to the repeating installation 211. When the test packet transmitting apparatus 111 receives a transmission stop signal transmitted from the measurement managing apparatus 241, the test packet transmitting apparatus 111 stops transmission of test packets.

The repeating installation 121 and terminal devices 221 to 223 are provided in the second subnet 120. The repeating installation 121 is connected with the terminal devices 221 to 223. The terminal devices 221 to 223 exchange signals among the terminal devices 221 to 223 via the repeating installation 121 or transmit/receive signals to/from the outside of the second subnet 120.

When the repeating installation 121 receives an RP setting signal transmitted from the measurement managing apparatus 241, the repeating installation 121 sets a multicast address, which is included in the RP setting signal as setting information, as a relay address used to identify packets to be relayed by the repeating installation 121.

When the repeating installation 121 receives a reception request signal transmitted from the test packet receiving apparatus 131, the repeating installation 121 sets a distribution destination address included as setting information in the reception request signal as a distribution destination address associated with the relay address. When the repeating installation 121 receives a packet with a relay address being destination, the repeating installation 121 performs multicast distribution of the received packet to a distribution address set in association with the relay address.

The repeating installation 231 and the test packet receiving apparatus 131 are provided in the third subnet 130. The test packet receiving apparatus 131 is connected with the repeating installation 231. For example, a Virtual Local Area Network (VLAN) is set between the repeating installation 231 and the test packet receiving apparatus 131, and the repeating installation 231 and the test packet receiving apparatus 131 transfer tagged Ether frames through the VLAN to transmit/receive signals. The test packet receiving apparatus 131 transmits/receives signals to/from the outside of the third subnet 130 via the repeating installation 231.

When the test packet receiving apparatus 131 receives a distribution setting signal from the measurement managing apparatus 241, the test packet receiving apparatus 131 sets, as reception addresses, a plurality of distribution destination addresses included in the distribution setting signal as setting information. When the test packet receiving apparatus 131 receives the distribution setting signal, the test packet receiving apparatus 131 transmits to the repeating installation 121 a plurality of reception request signals including the distribution destination addresses included as the setting information in the distribution setting signal, where the distribution destination addresses working as transmission source IP addresses.

The test packet receiving apparatus 131 receives a packet transmitted based on multicast distribution using a set reception address as a destination. When the test packet receiving apparatus 131 receives a result request signal transmitted from the measurement managing apparatus 241, the test packet receiving apparatus 131 transmits a counting result of respective test packets for each type of identification information received from the repeating installation 121 to the measurement managing apparatus 241.

In this example, although the explanation is given as to the structure where the measurement managing apparatus 241 provided in the fourth subnet 240 remotely controls the test packet transmitting apparatus 111, the repeating installation 121, and the test packet receiving apparatus 131, the measurement managing apparatus 241 may be provided in one of the first subnet 110, the second subnet 120, and the third subnet 130. The measurement managing apparatus 241 may be an apparatus that is integrated with one of the test packet transmitting apparatus 111, the repeating installation 121, and the test packet receiving apparatus 131.

Figure 3:
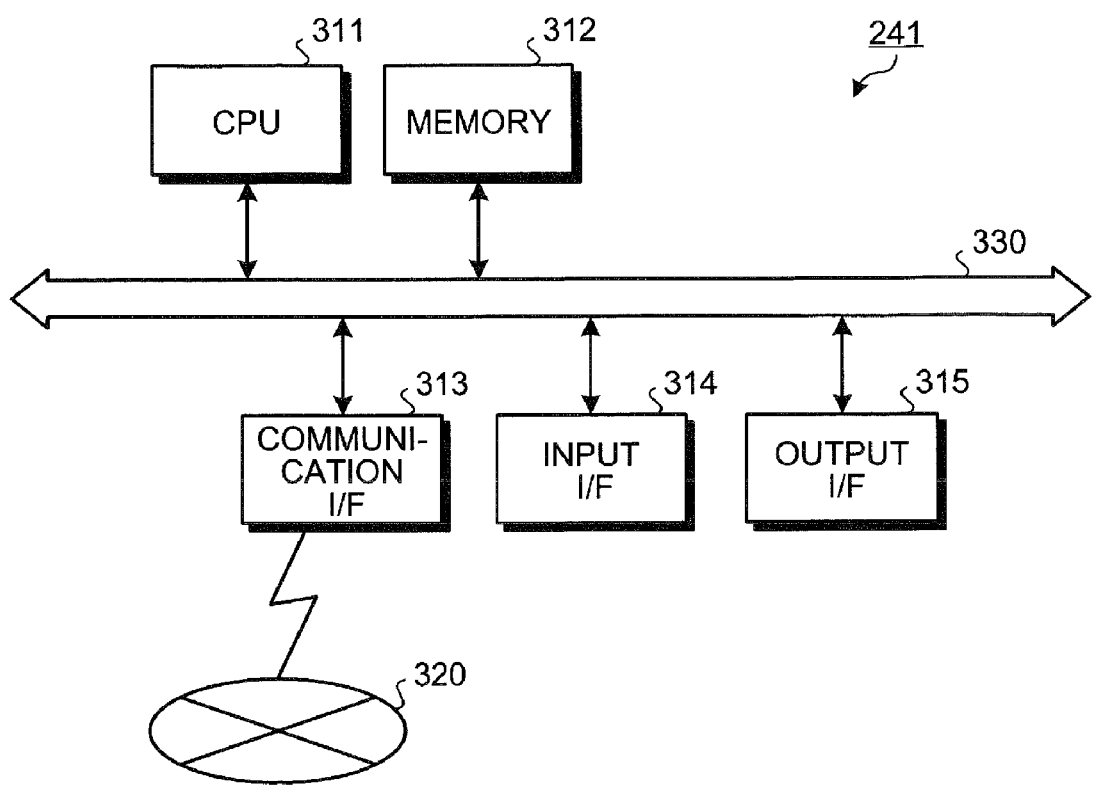
FIG. 3 is a block diagram of a hardware structure of a measurement managing apparatus 241 depicted in FIG. 2.

FIG. 3 is a block diagram of a hardware structure of the measurement managing apparatus 241 depicted in FIG. 2. As depicted in FIG. 3, the measurement managing apparatus 241 includes a central processing unit (CPU) 311, a memory 312, a communication interface (I/F) 313, an input interface (I/F) 314, and an output interface (I/F) 315.

The CPU 311 controls the entire measurement managing apparatus 241. The memory 312 is, e.g., a read only memory (ROM), a random access memory (RAM), a hard disk (HD), an optical disk, or a flash memory. The memory 312 is used as a work area for the CPU 311. Various kinds of programs are stored in the memory 312 and loaded in response to a command from the CPU 311.

The communication interface 313 transmits/receives a signal to/from the repeating installation 242 via a network 320. The communication interface 313 is, e.g., a network interface card (NIC). The input I/F 314 accepts specification of a section where a communication quality is measured or specification of a predetermined number of copies of a test packet. The input I/F 314 is, e.g., a keyboard or a mouse.

The output I/F 315 outputs a counting result of test packets to a user. The output interface 315 is, e.g., a monitor, a speaker, or a printer. The CPU 311, the memory 312, the communication I/F 313, the input I/F 314, and the output I/F 315 are connected with each other through a bus 330.

Figure 4:
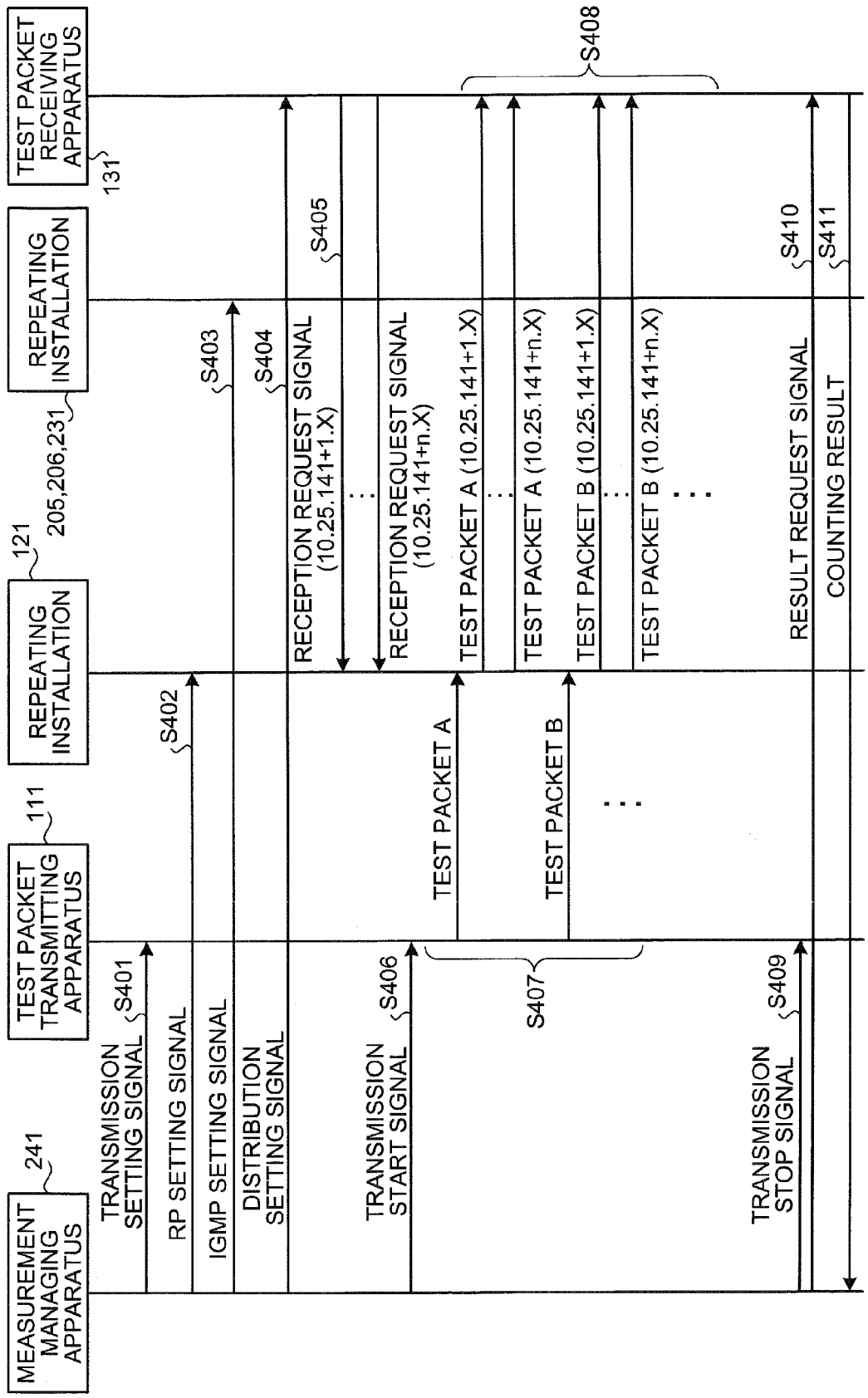
FIG. 4 is a sequence diagram of an example of an operation of a communication system 100 depicted in FIG. 2.

FIG. 4 is a sequence diagram of an example of an operation of the communication system 100 depicted in FIG. 2. The measurement managing apparatus 241 transmits a transmission setting signal to the test packet transmitting apparatus 111 (step S401). The test packet transmitting apparatus 111 having received the transmission setting signal at the step S401 sets a multicast address included as setting information in the transmission setting signal as a destination address for a test packet.

The measurement managing apparatus 241 transmits an RP setting signal to the repeating installation 121 (step S402). The repeating installation 121 having received the RP setting signal at the step S402 sets a multicast address included as setting information in the received RP setting signal as a relay address.

Subsequently, the measurement managing apparatus 241 transmits an Internet Group Management Protocol (IGMP) setting signal to each of the repeating installation 205, 206, and 231 (step S403). Each of the repeating installations 205, 206, and 231 having received the IGMP setting signal at the step S403 performs its own proxy setting so as to transfer a reception request signal transmitted from the test packet receiving apparatus 131 to the repeating installation 121.

The measurement managing apparatus 241 transmits a distribution setting signal to the test packet receiving apparatus 131 (step S404). The test packet receiving apparatus 131 having received the distribution setting signal at the step S404 sets a plurality of distribution destination addresses included as setting information in the distribution setting signal as reception addresses of itself. It is assumed here that distribution destination addresses are n distribution destination addresses "10.25.141+1.X" to "10.25.141+n.X".

The test packet receiving apparatus 131 transmits n reception request signals to the repeating installation 121, the n reception request signals having the distribution destinations, which are set as the reception addresses of itself, being determined as transmission source IP addresses (step S405). Specifically, the test packet receiving apparatus 131 transmits the n reception request signal having "10.25.141+1.X" to "10.25.141+n.X" being determined as the transmission source IP addresses.

The repeating installation 121 having received the n reception request signals sets the respective transmission source IP addresses of the n reception request signals as a plurality of distribution destination addresses associated with the multicast address included in the RP setting signal received at the step S402. The measurement managing apparatus 241 transmits a transmission start signal to the test packet transmitting apparatus 111 (step S406).

Subsequently, the test packet transmitting apparatus 111 determines the multicast address set at the step S401 as a destination address to transmit test packets to the repeating installation 121 (step S407). The test packet transmitting apparatus 111 keeps transmitting test packets while incrementing identification information from start of transmission of the test packets to reception of a transmission stop signal from the measurement managing apparatus 241. In this example, the test packet transmitting apparatus 111 sequentially transmits a test packet A, a test packet B, and so on.

The repeating installation 121 makes a copy of the received test packet every time the repeating installation 121 receives the test packet from the test packet transmitting apparatus 111 at the step S407. The repeating installation 121 uses the distribution destination addresses "10.25.141+1.X" to "10.25.141+n.X" set at the step S405 as distribution destination addresses to perform multicast distribution (step S408).

The test packet receiving apparatus 131 sets "10.25.141+1.X" to "10.25.141+n.X" as the reception addresses at the step S404. Therefore, the n test packets subjected to multicast distribution at the step S408 are received by the test packet receiving apparatus 131.

When a predetermined time period passes after transmission of the transmission start signal at the step S406, the measurement managing apparatus 241 transmits a transmission stop signal to the test packet transmitting apparatus 111 (step S409). The test packet transmitting apparatus 111 having received the transmission stop signal stops transmission of the test packets. Subsequently, the measurement managing apparatus 241 transmits a result request signal to the test packet receiving apparatus 131 (step S410).

The test packet receiving apparatus 131 transmits a counting result of the respective test packet for each type of identification information received at the step S408 to the measurement managing device 241 (step S411). On the other hand, the measurement managing apparatus 241 outputs the counting result received from the test packet receiving apparatus 131, thereby terminating the series of processing. Timing on which the measurement managing apparatus 241 transmits the transmission start signal at the step S406 comes after completion of the RP setting of the repeating installation 121.

For example, the measurement managing apparatus 241 transmits the transmissions start signal after elapse of a sufficient time from transmission of the distribution setting signal at the step S404. Alternatively, the repeating installation 121 may transmit an RP setting completion signal to the measurement managing apparatus 241 when the RP setting of the repeating installation 121 is completed at the step S405. In this case, the measurement managing apparatus 241 transmits the transmission start signal after the RP setting completion signal is received from the repeating installation 121.

Figure 5A:
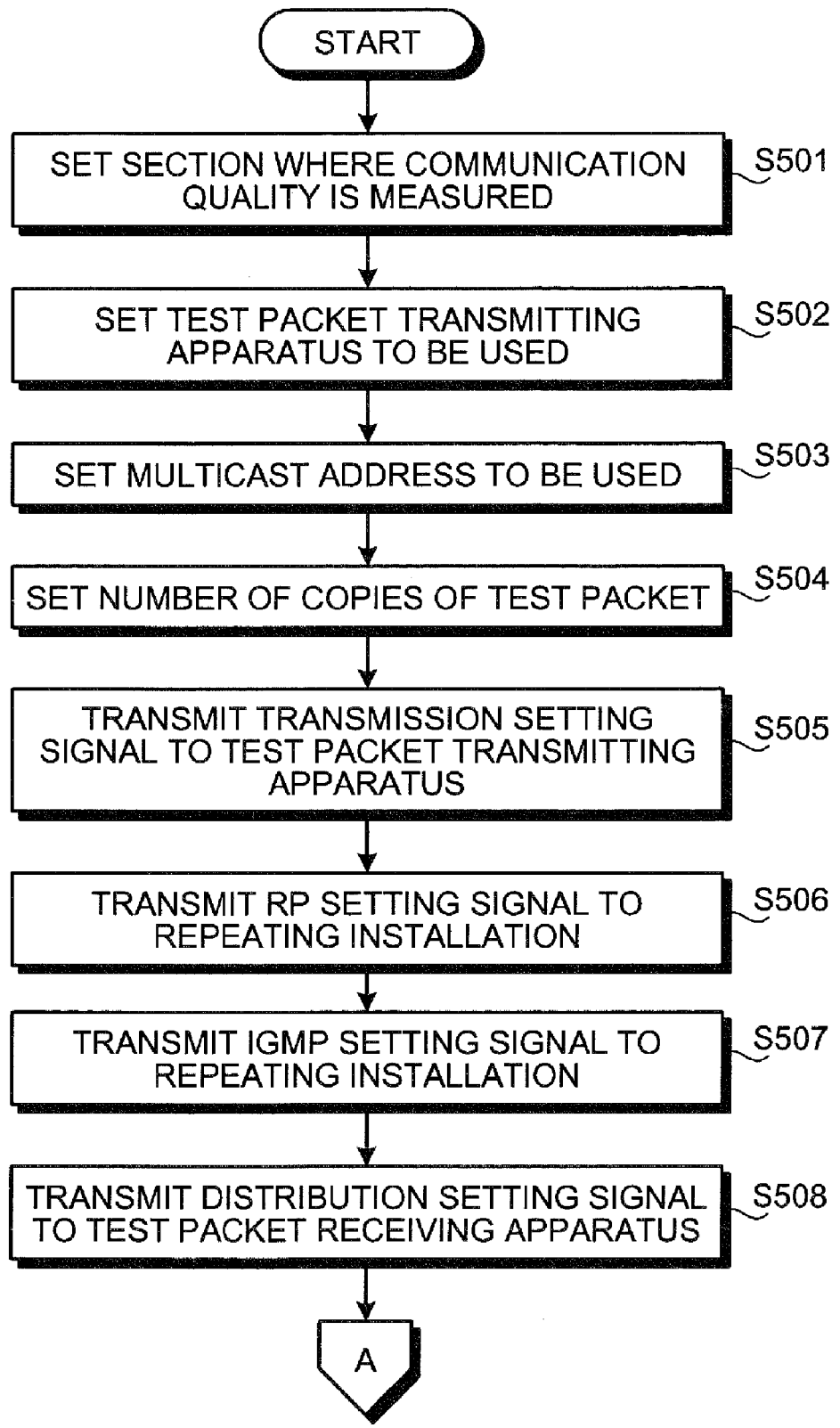
FIG. 5A is a flowchart (part 1) of an example of the operation of the measurement managing apparatus 241 depicted in FIG. 2.
Figure 5B:
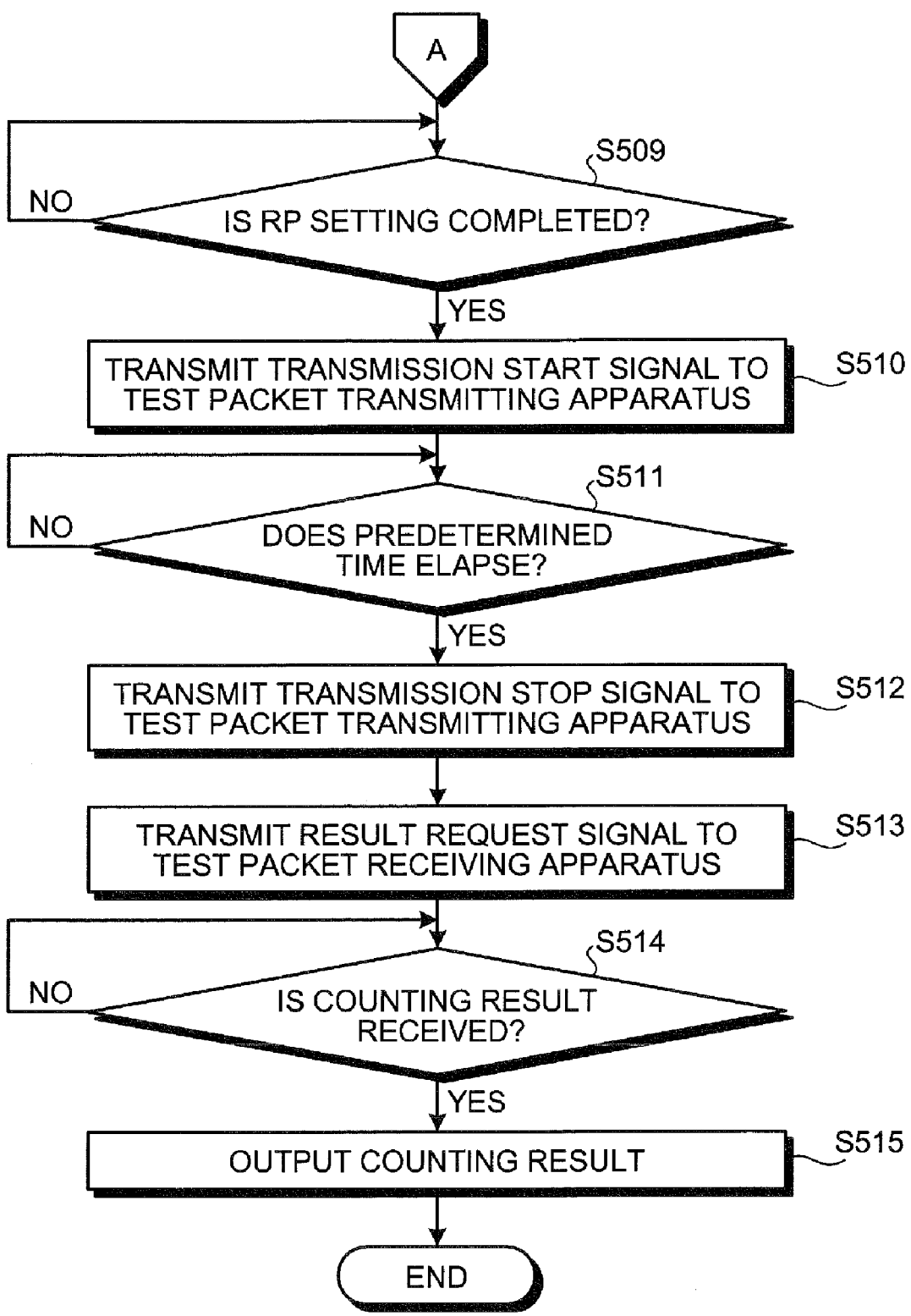
FIG. 5B is a flowchart (part 2) of an example of an operation of the measurement managing apparatus 241 depicted in FIG. 2.

FIG. 5A is a flowchart (part 1) of an example of the operation of the measurement managing apparatus 241 depicted in FIG. 2. FIG. 5B is a flowchart (part 2) of an example of the operation of the measurement managing apparatus 241 depicted in FIG. 2. As depicted in FIG. 5A, a section where a communication quality is measured is first set (step S501). Specifically, when measuring a communication quality between the second subnet 120 and the third subnet 130, the repeating installation 121 and the test packet receiving apparatus 131 as communication devices at both ends are set.

A test packet transmitting apparatus to be used is set (step S502). Specifically, the test packet transmitting apparatus 111 is set as the test packet transmitting apparatus to be used. Subsequently, a multicast address required to distribute test packets is set (step S503). The number of copies made from each test packet is set (step S504).

Subsequently, a transmission setting signal including as setting information the multicast address set at the step S503 is transmitted to the test packet transmitting apparatus set at the step S502 (step S505). An RP setting signal including as setting information the multicast address set at the step S503 is transmitted to the repeating installation 121 as a starting end device in the section set at the step S501 (step S506).

Subsequently, an IGMP setting signal including as setting information the multicast address set at the step S503 is transmitted to each repeating installation in the section set at the step S501 (step S507). Specifically, the IGMP setting signal is transmitted to the repeating installation 205, the repeating installation 206, and the repeating installation 231 provided in the section between the repeating installation 121 and the test packet receiving apparatus 131.

A distribution setting signal including as setting information the same number of arbitrary distribution destination addresses as the number of copies set at the step S504 is transmitted to the test packet receiving apparatus 131 as a trailing end device in the section set at the step S501 (step S508), and the control advances to each step in FIG. 5B through reference character A in the drawing.

Subsequently, whether RP setting of the repeating installation 121 is completed is judged (step S509), and the control waits until this setting is completed (step S509: NO). For example, whether the RP setting is completed is judged based on whether an RP setting completion signal is received from the repeating installation 121. When the RP setting is completed (step S509: YES), a transmission start signal is transmitted to the test packet transmitting apparatus set at the step S502 (step S510).

Whether a predetermined time passes after transmission of the transmission start signal at the step S510 is judged (step S511), and the control waits until the predetermined time passes (step S511: NO). The predetermined waiting time at the step S511 is a time that is sufficient for the repeating installation 121 to receive at least one test packet. When the predetermined time passes (step S511: YES), a transmission stop signal is transmitted to the test packet transmitting apparatus set at the step S502 (step S512).

Subsequently, a result request signal is transmitted to the test packet receiving apparatus set at the step S501 (step S513). Whether the test packet receiving apparatus receives a counting result is judged (step S514), and the control waits until the counting result is received (step S514: NO). When the counting result is received (step S514: YES), the received counting result is output (step S515), thereby terminating the series of processing.

Figure 6:
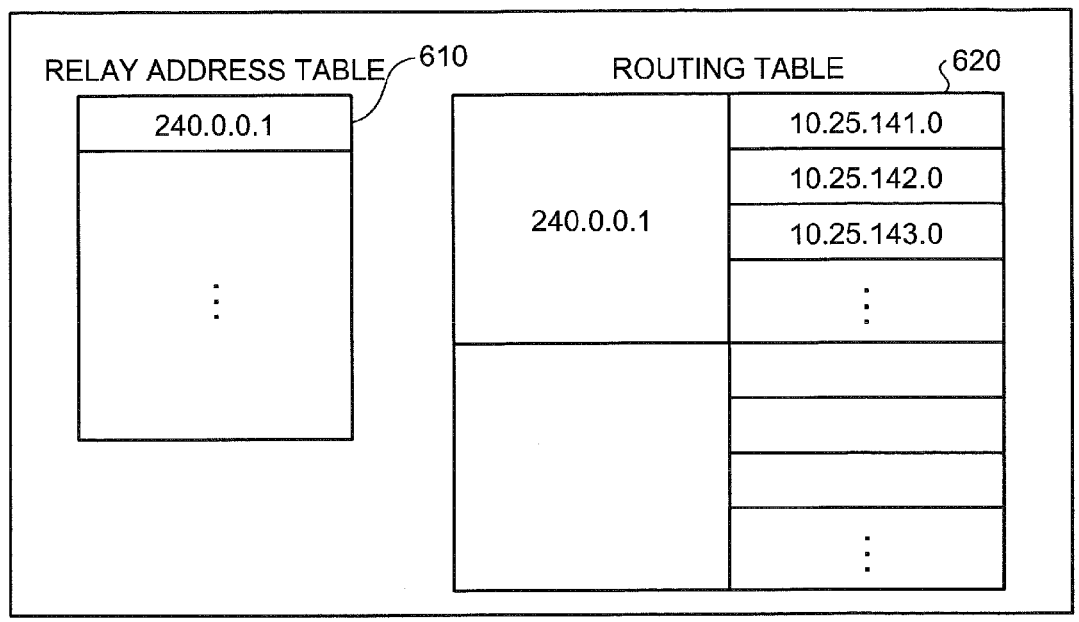
FIG. 6 is a view of an example of a table included in the repeating installation 121 depicted in FIG. 2.

FIG. 6 is a view of an example of a table included in the repeating installation 121 depicted in FIG. 2. The repeating installation 121 has a relay address table 610 and a routing table 620 depicted in FIG. 6. The relay address table 610 is a table depicting a list of relay addresses required to identify packets as relay targets of the repeating installation 121.

When the repeating installation 121 receives an RP setting signal from the measurement managing apparatus 241, the repeating installation 121 sets a multicast address included as setting information in the received RP setting signal in the relay address table 610. In this example, a multicast address "240.0.0.1" is set as a relay address in the relay address table 610.

The routing table 620 is a table having the multicast address set in the relay address table 610 and distribution destination addresses required to perform multicast distribution being set in association with each other. When the repeating installation 121 receives a reception request signal from the test packet receiving apparatus 131, the repeating installation 121 judges whether a multicast address included as setting information in the received reception request signal is set in the relay address table 610.

When the multicast address included as the setting information in the received reception request signal is set in the relay address table 610, the repeating installation 121 sets the multicast address included as the setting information in the reception request signal and a transmission source IP address of the received reception request signal in the routing table 620 in association with each other.

In this example, distribution destination addresses "10.25.141.0", "10.25.142.0", "10.25.143.0", . . . are set in association with the relay address "240.0.0.1" in the routing table 620. Besides these addresses, addresses required for the terminal devices 221 to 223 to perform transmission/reception of signals are set in the relay address table 610 and the routing table 620, for example.

Figure 7:
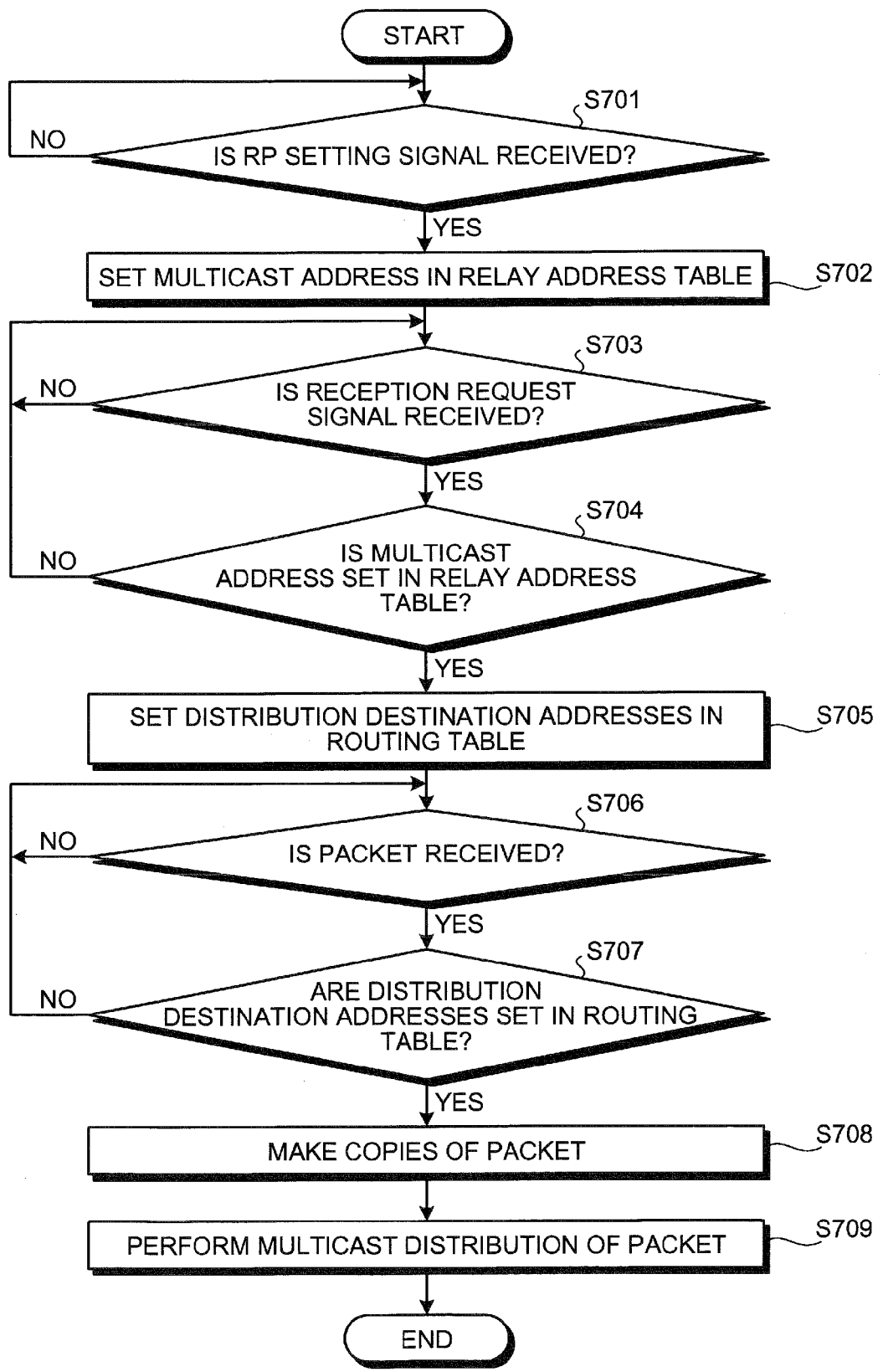
FIG. 7 is a flowchart of an example of the operation of the repeating installation 121 depicted in FIG. 2.

FIG. 7 is a flowchart of an example of the operation of the repeating installation 121 depicted in FIG. 2. First, whether an RP setting signal is received is judged (step S701), and the control waits until the RP setting signal is received (step S701: NO). When the RP setting signal is received (step S701: YES), a multicast address included as setting information in the received RP setting signal is set in the relay address table 610 (step S702).

Whether a reception request signal is received is judged (step S703), and the control waits until the reception request signal is received (step S703: loop of NO). When the reception request signal is received (step S703: YES), whether a multicast address included as setting information in the received reception request signal is set in the relay address table 610 is judged (step S704).

When the multicast address is not set in the relay address table 610 at the step S704 (step S704: NO), the control returns to the step S703 to continue the processing. When the multicast address is set in the relay address table 610 (step S704: YES), a transmission source IP address of the reception request signal received at the step S703 is set in the routing table 620 in association with the multicast address included as the setting information in the reception request signal (step S705).

Whether a packet is received is judged (step S706), and the control waits until the packet is received (step S706: loop of NO). When the packet is received (step S706: YES), whether a destination address of the received packet is set to the multicast address in the routing table 620 is judged (step S707).

When the destination address of the packet is not set to the multicast address in the routing table 620 (step S707: NO), the control returns to the step S706 to continue the processing. When the destination address of the packet is set to the multicast address in the routing table 620 (step S707: YES), the received packet is duplicated to the number of distribution destination addresses set in association with the multicast address of the destination address of the received packet in the routing table 620 (step S708).

Subsequently, each duplicate packet generated at the step S708 is subjected to multicast distribution with each distribution destination address set in association with the multicast address of the destination address of the received packet being determined as a distribution destination (step S709), and the series of processing is terminated.

Figure 8:
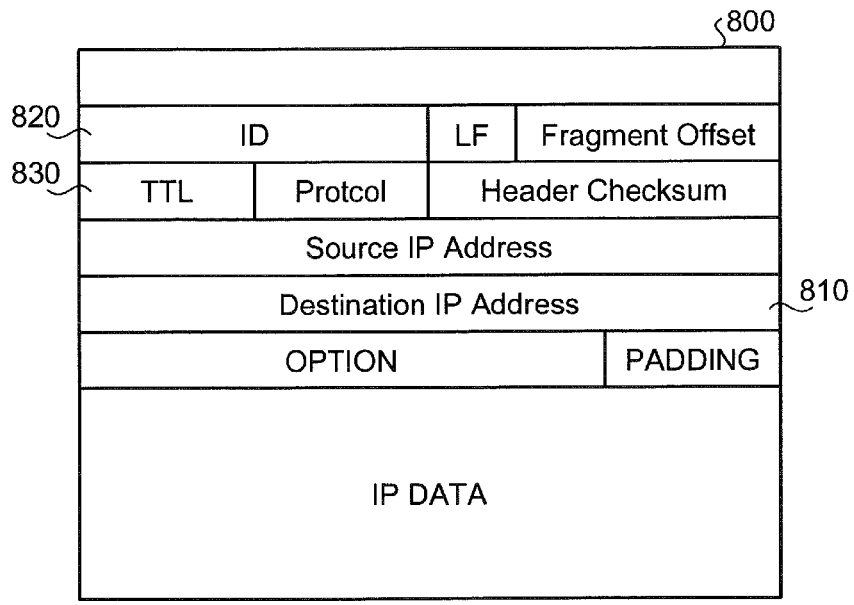
FIG. 8 is a view of an example of a format of a test packet.

FIG. 8 is a view of an example of a format of a test packet. A format of a regular IP packet 800 depicted in FIG. 8 can be used for a test packet transmitted by the test packet transmitting apparatus 111. The test packet transmitting apparatus 111 stores a multicast address included as setting information in a received transmission setting signal in, e.g., a destination IP address 810 (DA) of an IP packet 800.

A multicast address set in the DA 810 is specifically any one of addresses 224.0.0 to 239.255.255 used as multicast addresses. As the identification information, for example, an ID field 820 or a TTL field 830 of the IP packet 800 can be used.

Figure 9:
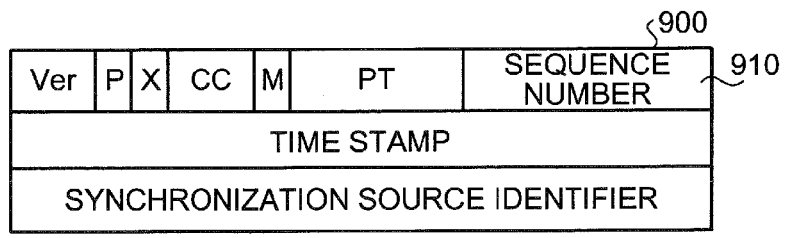
FIG. 9 is a view of another example of the format of the test packet.

FIG. 9 is a view of another example of the format of the test packet. As a test packet transmitted by the test packet transmitting apparatus 111, a Real time Transport Protocol (RTP) packet can be used. In an RTP header 900 depicted in FIG. 9, P stands for padding; X, extension; CC, CSRC count; and M, marker. As the identification information, for example, a sequence number field 910 in the RTP header 900 can be used.

Figure 10:
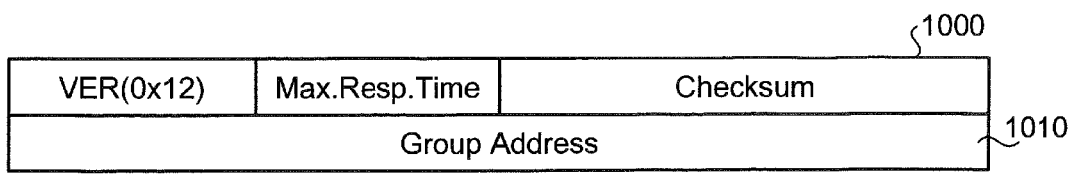
FIG. 10 is a view of an example of a format of a reception request signal.

FIG. 10 is a view of an example of a format of a reception request signal. As depicted in FIG. 10, the test packet receiving apparatus 131 stores a multicast address in a group address field 1010 in an IGMP join message 1000. The test packet receiving apparatus 131 transmits the IGMP join message 1000 by using an IP packet. In this case, the test packet receiving apparatus 131 stores a distribution destination address in a source IP address (SA) (see FIG. 8) of the IP packet.

Figure 11:
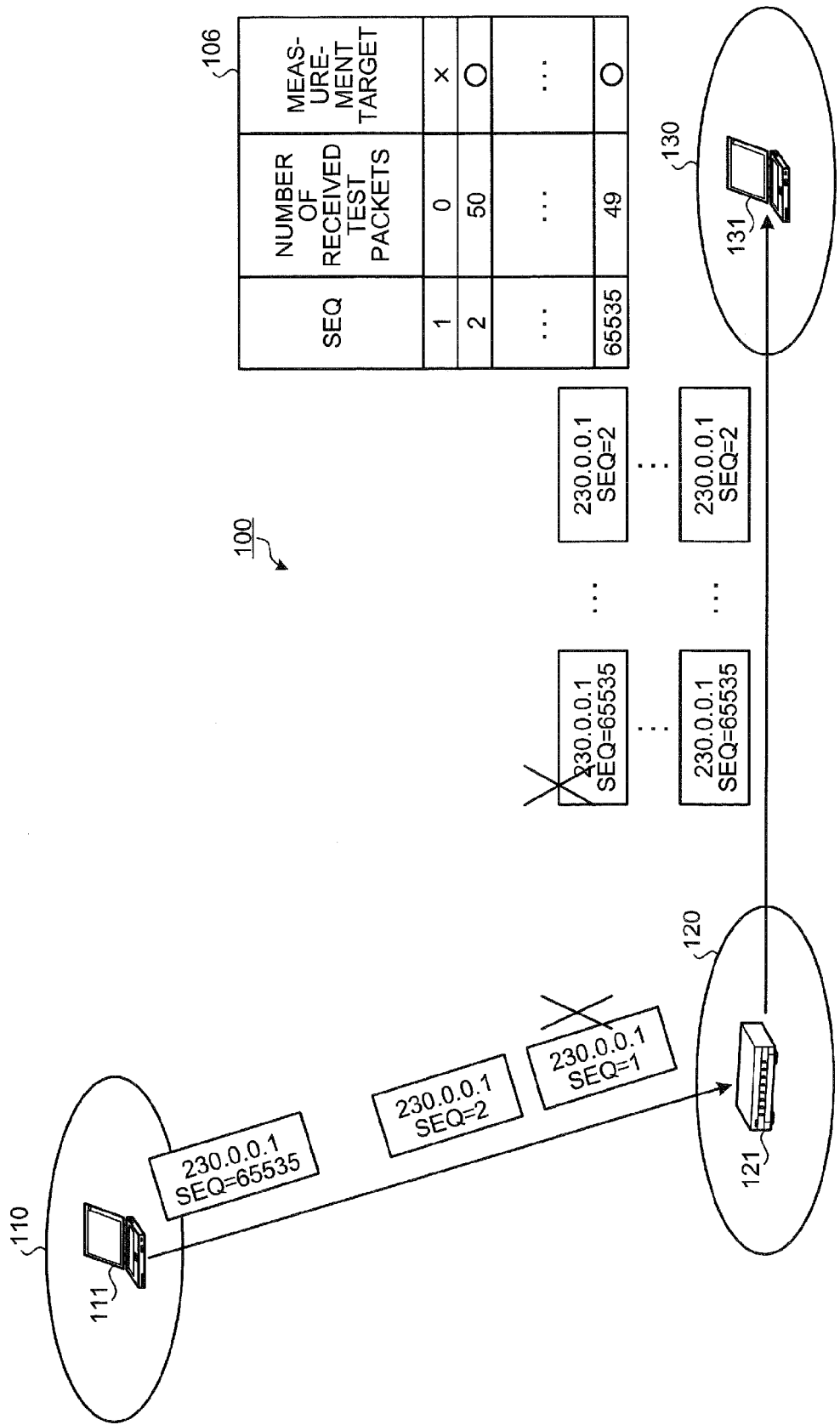
FIG. 11 is a block diagram of Measurement Example 1 when an SEQ is used as identification information.

FIG. 11 is a block diagram of Measurement Example 1 when an SEQ is used as identification information. In FIG. 11, components identical to those depicted in FIG. 1 are given identical reference numerals, and an explanation thereof is omitted. FIG. 11 depicts an example where "230.0.0.1" is used as a multicast address and an SEQ (see reference numeral 910 in FIG. 9) of an RTP packet is used as identification information.

As depicted in FIG. 11, the test packet transmitting apparatus 111 transmits 65535 test packets having a destination address "230.0.0.1" and SEQs 1, 2, . . . , 65535. In this example, it is assumed that a test packet having an SEQ 1 is lost in a path between the test packet transmitting apparatus 111 and the repeating installation 121.

The repeating installation 121 makes a predetermined number of copies of each of the test packets having the SEQs 2, . . . , 65535 to be transmitted to the test packet receiving apparatus 131. It is assumed that one of the predetermined number of test packets having the SEQ 65535 is lost in a path between the repeating installation 121 and the test packet receiving apparatus 131. In this case, as depicted in the table 106, the test packet receiving apparatus 131 does not receive the test packets having the SEQ 1 at all.

The test packet receiving apparatus 131 receives the 50 test packets having the SEQ 2. The test packet receiving apparatus 131 also receives the 49 test packets having the SEQ 65535. The test packet receiving apparatus 131 excludes the test packets having the identification information that is not received at all from measurement targets. Therefore, the test packets having the SEQ 1 are excluded from the measurement targets. Accordingly, the loss produced in the path between the test packet transmitting apparatus 111 and the repeating installation 121 can be excluded from a counting result obtained by the test packet receiving apparatus 131.

Figure 12:
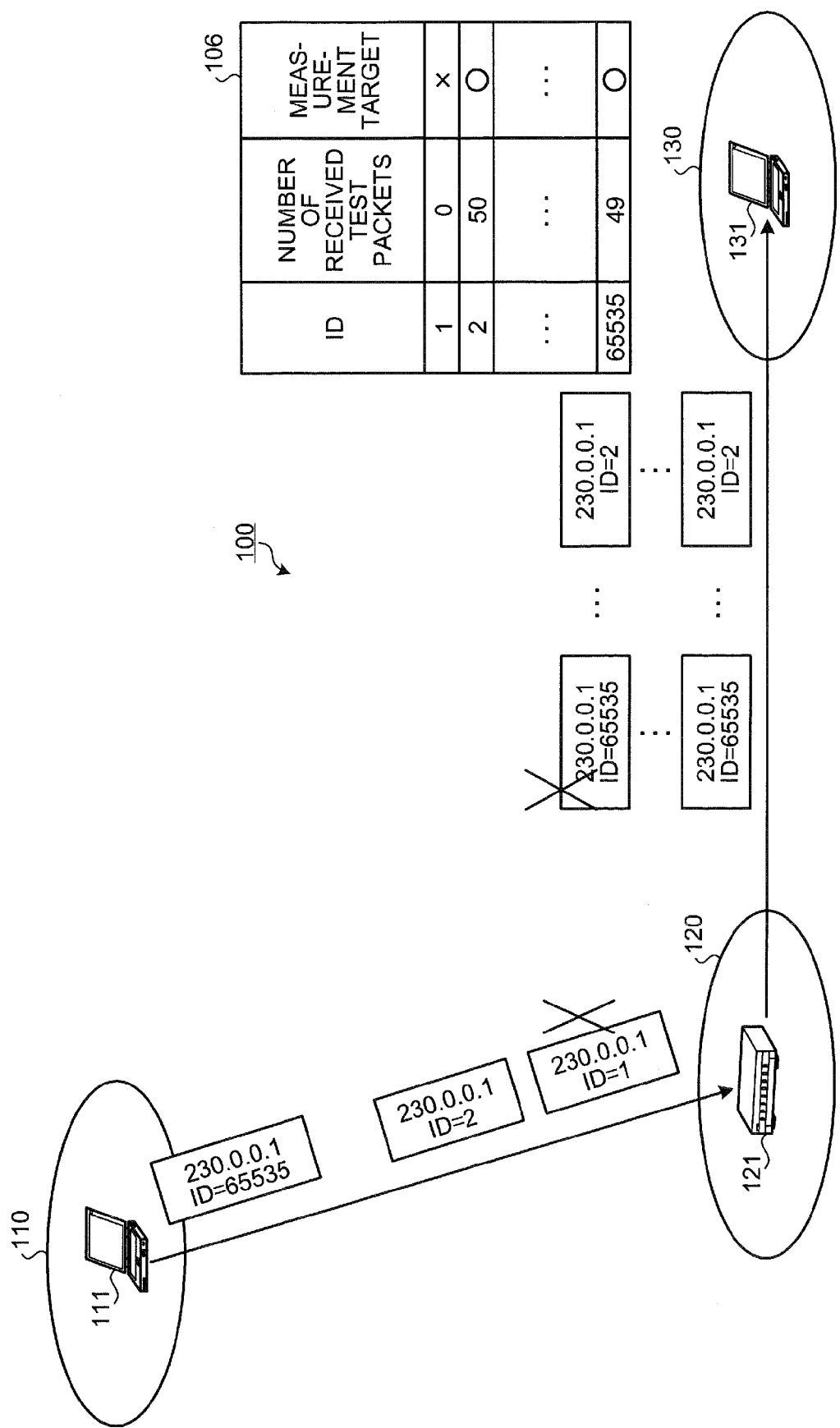
FIG. 12 is a block diagram of Measurement Example 1 when an ID is used as identification information.

FIG. 12 is a block diagram of Measurement Example 1 when an ID is used as identification information. In FIG. 12, components identical to those depicted in FIG. 11 are given identical reference numerals, and an explanation thereof is omitted. FIG. 12 depicts an example where "230.0.0.1" is used as a multicast address and an ID (see reference numeral 820 in FIG. 8) of an IP packet as identification information.

As depicted in FIG. 12, the test packet transmitting apparatus 111 transmits 65535 test packets having a destination address "230.0.0.1" and IP packet IDs "1, 2, . . . , 65535". It is assumed that the test packet having the ID 1 is lost in a path between the test packet transmitting apparatus 111 and the repeating installation 121 in this example.

The repeating installation 121 makes a predetermined number of copies of each of the test packets having the IDs 2, . . . , 65535 to be transmitted to the test packet receiving apparatus 131. It is assumed that one of the predetermined number of test packets having the ID 65535 is lost in a path between the repeating installation 121 and the test packet receiving apparatus 131. In this case, as depicted in the table 106, the test packet receiving apparatus 131 does not receive the test packet having the ID 1 at all.

The test packet receiving apparatus 131 also receives the 50 test packets having the ID 2. The test packet receiving apparatus 131 further receives the 49 test packets having the ID 65535. The test packet receiving apparatus 131 excludes the test packet having identification information that is not received at all from measurement targets. Therefore, the test packets having the ID 1 are excluded from the measurement targets. Accordingly, the loss produced in the path between the test packet transmitting apparatus 111 and the repeating installation 121 can be excluded from a counting result obtained by the test packet receiving apparatus 131.

Figure 13:
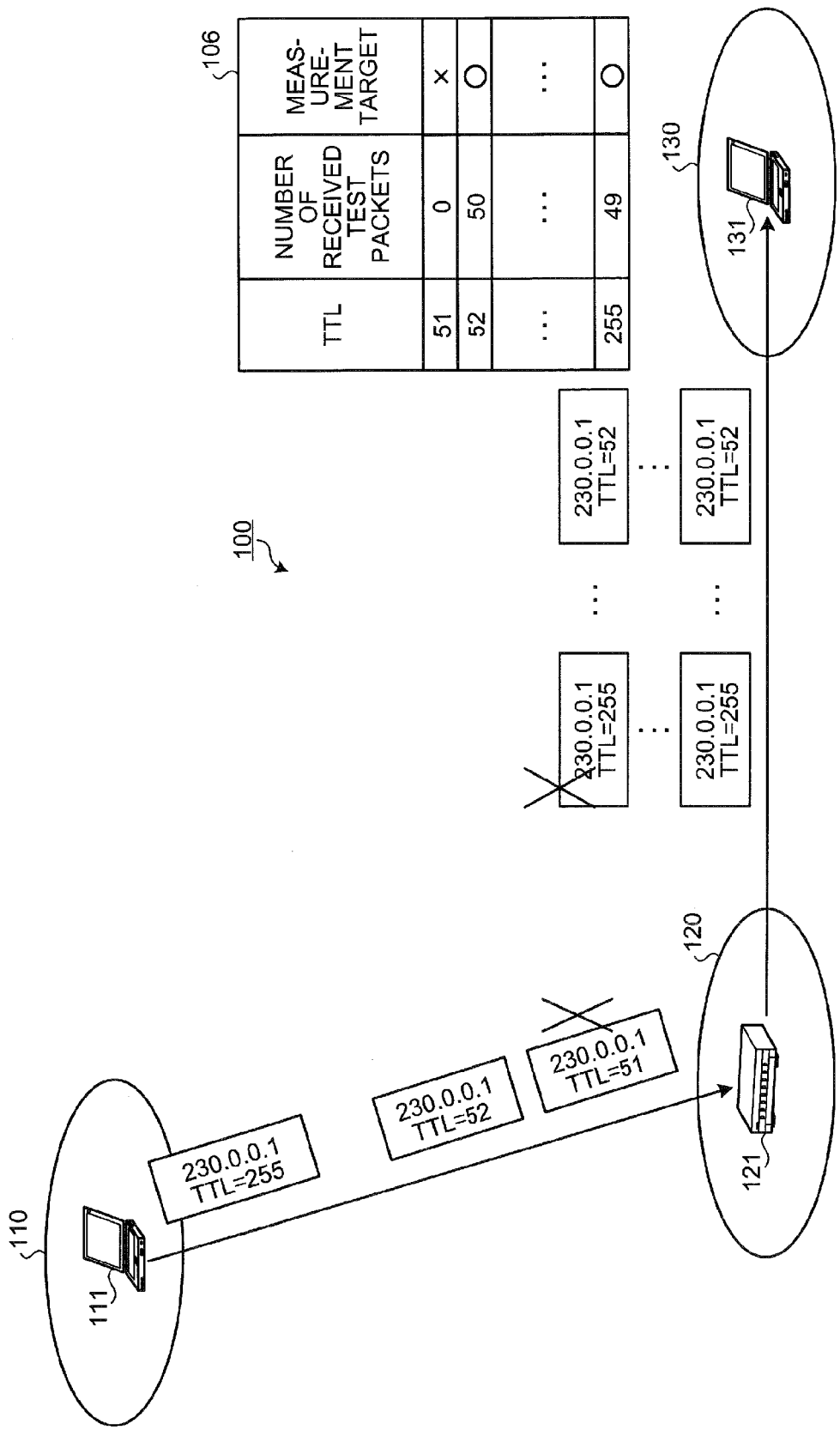
FIG. 13 is a block diagram of Measurement Example 1 when a TTL is used as identification information.

FIG. 13 is a block diagram of Measurement Example 1 when a TTL is used as identification information. In FIG. 13, components identical to those depicted in FIG. 11 are given identical reference numerals, and an explanation thereof is omitted. FIG. 13 depicts an example where "230.0.0.1" is used as a multicast address and a TTL (see reference numeral 830 in FIG. 8) of an IP packet is used as identification information.

As depicted in FIG. 13, the test packet transmitting apparatus 111 transmits 205 test packets having a destination address "230.0.0.1" and respective IP packet TTLs 51, 52, . . . , 255. It is assumed that the test packet having the TTL 51 is lost in a path between the test packet transmitting apparatus 111 and the repeating installation 121.

The repeating installation 121 makes a predetermined number of copies of each of the test packets having the TTLs 52, . . . , 255 to be transmitted to the test packet receiving apparatus 131. It is assumed that one of the predetermined number of the test packets having the TTL 255 is lost in a path between the repeating installation 121 and the test packet receiving apparatus 131. In this case, as depicted in the table 106, the test packet receiving apparatus 131 does not receive the test packets having the TTL 51 at all.

The test packet receiving apparatus 131 also receives the 50 test packets having the TTL 52. The test packet receiving apparatus 131 further receives the 49 test packets having the TTL 255. The test packet receiving apparatus 131 excludes the test packets having identification information that is not received at all from measurement targets. Therefore, the test packets having the TTL 51 are excluded from the measurement targets. Accordingly, the loss occurring in the path between the test packet transmitting apparatus 111 and the repeating device 121 can be excluded from a counting result obtained by the test packet receiving apparatus 131.

In the measuring method explained above, although the example where the measurement managing apparatus 241 transmits the IGMP setting signal to each of the repeating installations 205, 206, and 231 between the test packet receiving apparatus 131 and the repeating installation 121 since the test packet receiving apparatus 131 transfers the reception request signal to the repeating installation 121 is explained, the method for transferring the reception request signal is not restricted thereto.

For example, the measurement managing apparatus 241 may transfer the reception request signal by setting a VLAN in a path from the test packet receiving apparatus 131 to the repeating installation 121. In this case, the measurement managing apparatus 241 transmits the same number of VLAN setting signals as the predetermined number of copies of each test packet to each of the repeating installations 121, 205, 206, and 231 in place of transmitting the IGMP setting signal to each of the repeating installations 205, 206, and 231.

Respective pieces of VLAN setting information transmitted by the measurement managing apparatus 241 include different VLAN numbers as setting information. Upon receiving the VLAN setting information, each of the repeating installations 121, 205, 206, and 231 forms a VLAN having the VLAN number included in the VLAN setting information as the setting information. As a result, the same number of VLANs as the predetermined number of copies of each packet is set in the path between the test packet receiving apparatus 131 and the repeating installation 121.

The test packet receiving apparatus 131 transmits the reception request signal to the repeating installation 121 via each VLAN set by the measurement managing apparatus 241. The repeating installation 121 transmits each copied test packet to the test packet receiving apparatus 131 through each VLAN set by the measurement managing apparatus 241. A measurement example where each VLAN is set in a path between the test packet receiving apparatus 131 and the repeating installation 121 will now be explained.

Figure 14:
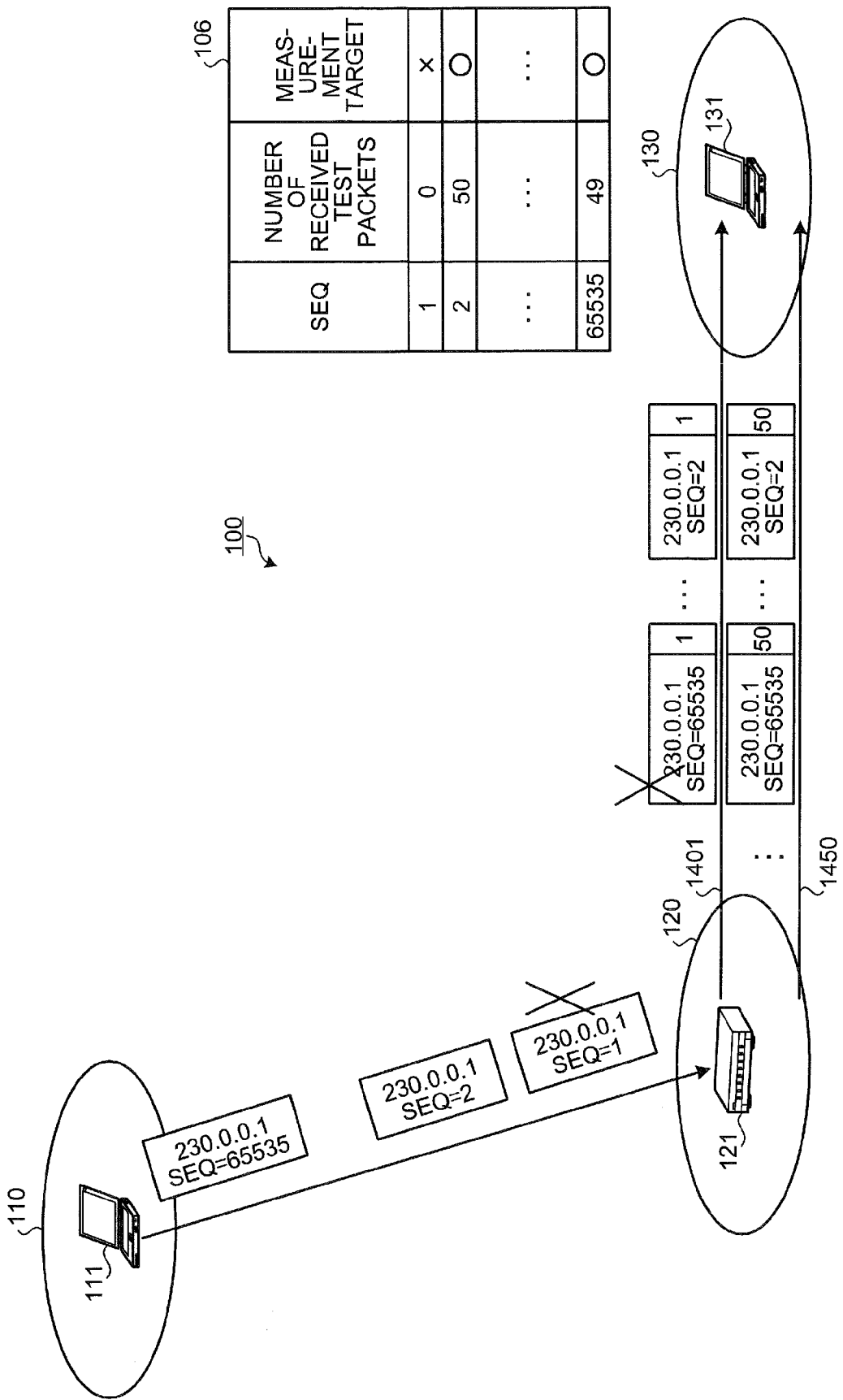
FIG. 14 is a block diagram of Measurement Example 2 when an SEQ is used as identification information.

FIG. 14 is a block diagram of Measurement Example 2 when an SEQ is used as identification information. In FIG. 14, components identical to those depicted in FIG. 11 are given identical reference numerals, and an explanation thereof is omitted. FIG. 14 depicts a measurement example where each VLAN is set in the path between the test packet receiving apparatus 131 and the repeating installation 121 in Measurement Example 1 depicted in FIG. 11. A situation where the number of copies of each test packet made by the repeating installation 121 is 50 will be explained.

As depicted in FIG. 14, 50 VLANs 1401 to 1450 equal to copies of each test packet made by the repeating installation 121 in number are set in the path between the test packet receiving apparatus 131 and the repeating installation 121. The test packet receiving apparatus 131 transmits 50 reception request signals equal to the copies of each test packet made by the repeating installation 121 in number to the repeating installation 121 through the VLANs 1401 to 1450, respectively.

The repeating installation 121 adds VLAN numbers 1 to 50 to the 50 test packets duplicated according to each type of identification information and transmits the resultant test packets. The transmitted 50 test packets having the VLAN numbers 1 to 50 added thereto are transmitted to the test packet receiving apparatus 131 through VLANs associated with the VLAN numbers in the VLANs 1401 to 1450.

Figure 15:
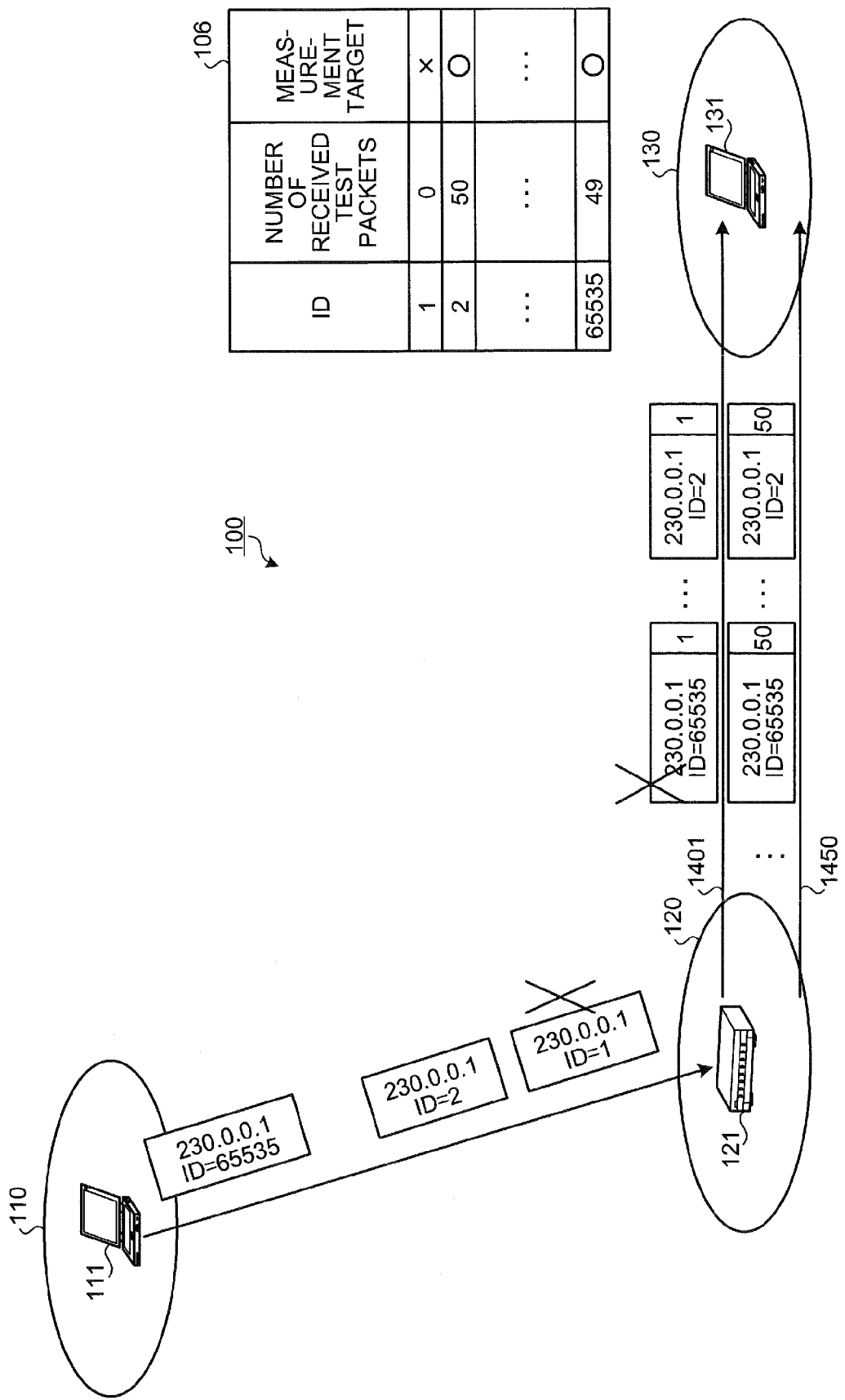
FIG. 15 is a block diagram of Measurement Example 2 when each ID is used as identification information.

FIG. 15 is a block diagram of Measurement Example 2 when each ID is used as identification information. In FIG. 15, components identical to those depicted in FIG. 12 are given identical reference numerals, and an explanation thereof is omitted. FIG. 15 depicts a measurement example where each VLAN is set in the path between the test packet receiving apparatus 131 and the repeating installation 121. An explanation on transfer of the reception request signal and the test packets will be omitted here since it is the same as that of FIG. 14.

Figure 16:
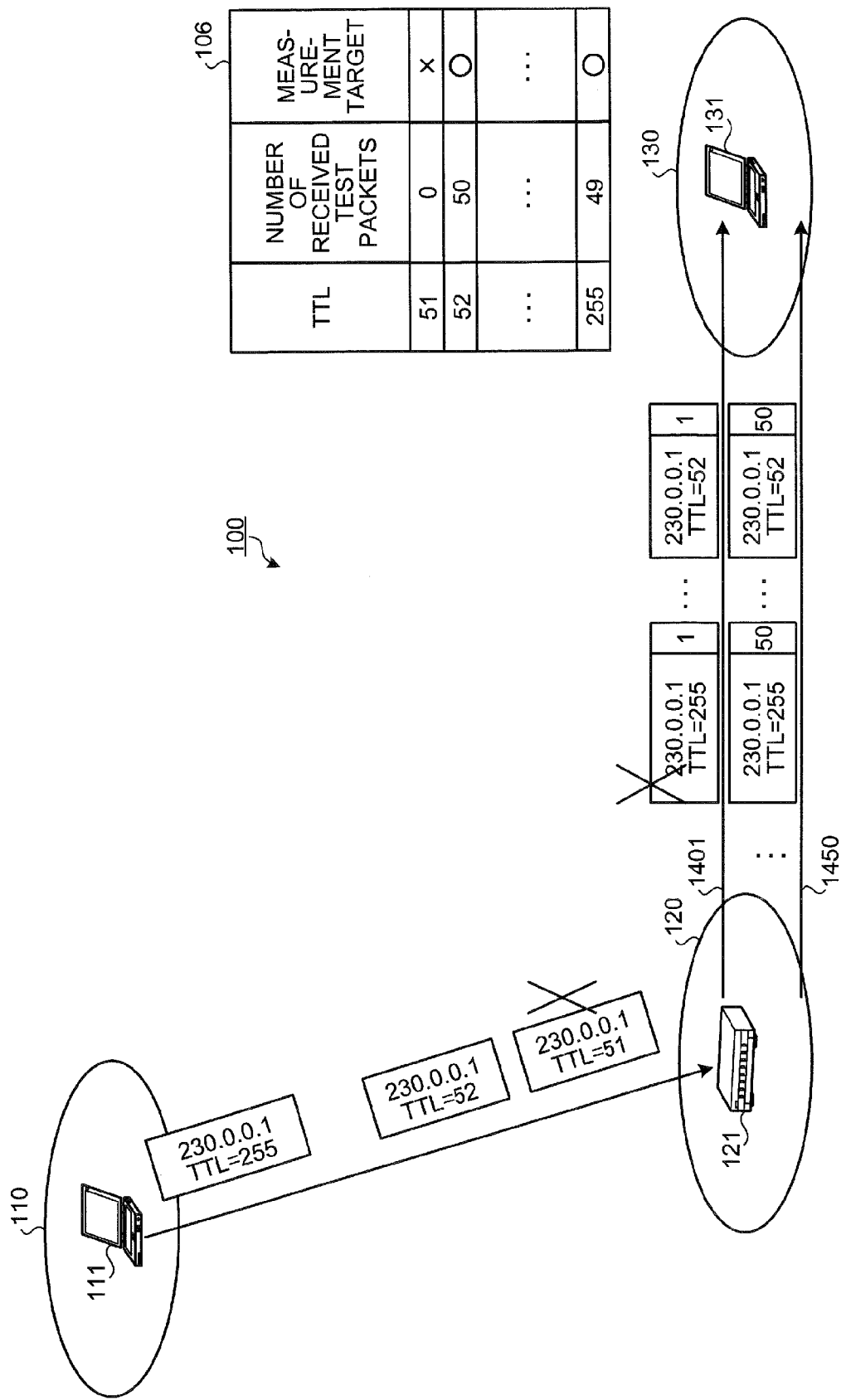
FIG. 16 is a block diagram of Measurement Example 2 when each TTL is used as identification information.

FIG. 16 is a block diagram of Measurement Example 2 when each TTL is used as identification information. In FIG. 16, components identical to those depicted in FIG. 13 are given identical reference numerals, and an explanation thereof is omitted. FIG. 16 depicts a measurement example where each VLAN is set in the path between the test packet receiving apparatus 131 and the repeating installation 121 in Measurement Example 1 depicted in FIG. 13. An explanation on transfer of the reception request signal and the test packets will be omitted here since it is the same as that of FIG. 14.

As explained above, according to this embodiment, a communication quality between the second subnet 120 and the third subnet 130 can be measured even if the test packet transmitting apparatus 111 that transmits a test packet is not provided in the second subnet 120. Therefore, the number of test devices required to measure a communication quality between the respective repeating installations in the communication system 100 can be reduced.

A test packet received by the repeating installation 121 can be duplicated, and the number of the duplicate test packets can be determined as a population to measure a communication quality. Therefore, even if a test packet is lost in the path between the test packet transmitting apparatus 111 and the repeating installation 121, a measurement result of a communication quality between the second subnet 120 and the third subnet 130 is not affected. Thus, according to this embodiment, the number of necessary test devices can be reduced, and a communication quality in a target section can be highly accurately measured.

Specifically, calculating information indicative of a transmission success rate of test packets obtained based on the number of copies of the test packets obtained by the repeating installation 121 and the number of the test packets received by the test packet receiving apparatus 131 from the repeating installation 121 enables highly accurately measuring a communication quality in a target section irrespective of a loss of a test packet that occurs in the path between the test packet transmitting apparatus 111 and the repeating installation 121.

Since the repeating installation at a starting end of a target section can be realized by a regular router compatible with multicast, a special structure does not have to be added to a subnet on the starting end side of the target section. For example, when a communication quality between the repeating installation 202 and the third subnet 130 depicted in FIG. 2 is measured, it is good enough to set the repeating installation 202 as an RP to carry out the above-explained method. Therefore, a communication quality in the target section can be highly accurately measured without adding a special structure.

When an IP packet is used as a test packet and a value of an ID field or a TTL field included in the IP packet is used as identification information, the regular IP packet can be utilized as the test packet without adding special information to the test packet. Therefore, an amount of information of the test packet does not have to be increased. A communication quality can be highly accurately measured without complicating a setting of the test packet transmitting apparatus 111.

Alternatively, when an RTP packet is used as a test packet and a sequence number included in the RTP packet is used as identification information, the regular RTP packet can be directly utilized as the test packet without adding special information to the test packet. Therefore, an amount of information of the test packet does not have to be increased. A communication quality can be highly accurately measured without complicating a setting of the test packet transmitting apparatus 111.

It is to be noted that the measuring method explained in this embodiment can be realized by executing a previously prepared program in a computer, e.g., a personal computer or a work station. This program is recorded in a computer-readable recording medium, e.g., a hard disk, a flexible disk, a CD-ROM, an MO, or a DVD, and it is executed when read out from the recording medium by the computer. This program may be a medium that can be distributed through a network, e.g., the Internet.

The measurement managing apparatus 241 explained in conjunction with this embodiment can be realized by an application specific IC (ASIC), e.g., a standard cell or a structured ASIC or a programmable logic device (PLD), e.g., field-programmable gate array (FPGA). Specifically, for example, each function of the above-explained measurement managing apparatus 241 is defined in the form of a hardware description language (HDL) description, and this HDL description is subjected to logic synthesis to be given to the ASIC or the PLD, thereby manufacturing the measurement managing apparatus 241.

As set forth above, the embodiments have an effect that the number of required test apparatuses can be reduced and a communication quality in a target section can be highly accurately measured.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A computer-readable, non-transitory medium storing a program causing a computer that controls a test packet transmitting apparatus provided in a first subnet, a repeating installation that is provided in a second subnet and performs multicast distribution of the received packet according to a routing table, and a test packet receiving apparatus provided in the third subnet to perform:
    setting a multicast address serving as a destination address of a plurality of test packets including different pieces of identification information in the test packet transmitting apparatus;
    setting the multicast address in the routing table as a relay address required to identify packets as relay targets of the repeating installation;
    setting a plurality of distribution destination addresses associated with the relay address in the routing table;
    setting the distribution destination addresses in the test packet receiving apparatus as reception addresses required to identify packets as reception targets of the test packet receiving apparatus;
    controlling the test packet transmitting apparatus in a manner that the test packet transmitting apparatus transmits the test packets; and
    acquiring a counting result for each identification information of each test packet received by the test packet receiving apparatus from the repeating installation as a result of the controlling.

2. The computer-readable, non-transitory medium according to claim 1, wherein at the acquiring, information indicative of a transmission success rate of the test packets calculated based on the counting result and the number of the distribution destination addresses set in the test packet receiving apparatus is acquired.

3. The computer-readable, non-transitory medium according to claim 1, further causing the computer to perform calculating information indicative of a transmission success rate of the test packets based on the counting result and the number of the distribution destination addresses set in the test packet receiving apparatus.

4. The computer-readable, non-transitory medium according to claim 1, wherein the test packet is an IP packet and the identification information is a value of an ID field or a TTL field in the IP packet.

5. The computer-readable, non-transitory medium according to claim 1, wherein the test packet is an RTP packet and the identification information is a sequence number of the RTP packet.

6. A measurement management apparatus that controls a test packet transmitting apparatus provided in a first subnet, a repeating installation that is provided in a second subnet and performs multicast distribution of the received packet according to a routing table, and a test packet receiving apparatus provided in the third subnet, the measurement management apparatus comprising:
    a first setting unit that sets a multicast address serving as a destination address of a plurality of test packets including different pieces of identification information in the test packet transmitting apparatus;
    a second setting unit that sets the multicast address in the routing table as a relay address required to identify packets as relay targets of the repeating installation;
    a third setting unit that sets a plurality of distribution destination addresses associated with the relay address set by the second setting unit in the routing table;
    a fourth setting unit that sets the distribution destination addresses in the test packet receiving apparatus as reception addresses required to identify packets as reception targets of the test packet receiving apparatus;

a transmission control unit that controls the test packet transmitting apparatus in a manner that the test packet transmitting apparatus transmits the test packets; and an acquiring unit that acquires a counting result for each identification information of each test packet received by the test packet receiving apparatus from the repeating installation as a result of control by the transmission control unit.

7. A communication system comprising:

a test packet transmitting apparatus that is included in a first subnet and transmits respective test packets including different pieces of identification information to the repeating installation;

a repeating installation that is included in a second subnet and receives the respective test packets transmitted by the test packet transmitting apparatus, makes a predetermined number of copies of each received test packet, and transmits the test packets copied to the predetermined number according to each identification information to the test packet receiving apparatus, the test packets copied having different addresses as destination addresses; and a test packet receiving apparatus to which the different addresses are assigned, wherein the test packet receiving apparatus is included in a third subnet and receives the respective test packets transmitted by the repeating installation, counts the received test packets according to each identification information, and calculates and outputs information indicative of the communication quality based on a counting result and the predetermined number, wherein a communication quality between the second subnet and the third subnet is measured.

8. A method for a communication system, said method comprising:

transmitting a test packet having a multicast address to a relaying apparatus;

receiving the test packet by the relaying apparatus;

transmitting a plurality of test packets having same identification information toward a plurality of VLANs corresponding to the multicast address by using a plurality of VLAN IDs in response to a reception of the test packet having the multicast address;

receiving, by a communication apparatus belonging to the plurality of VLANS, one or more test packets of the plurality of test packets; and analyzing a communication quality between the router and the communication apparatus based on a number of the plurality of VLANs and a number of the one or more test packets received by the communication apparatus.

* * * * *